United States Patent [19]
Marble

[11] 3,912,472
[45] Oct. 14, 1975

[54] AIR FILTER FOR GASEOUS POLLUTANTS

[75] Inventor: Robert I. Marble, Gardena, Calif.

[73] Assignee: Farr Company, El Segundo, Calif.

[22] Filed: Dec. 29, 1971

[21] Appl. No.: 213,474

[52] U.S. Cl. .................... 55/484; 55/387; 55/515
[51] Int. Cl. ........................................... B01d 53/04
[58] Field of Search ............... 55/316, 387–389, 55/482–484, 502, 512–519

[56] References Cited
UNITED STATES PATENTS

| | | | |
|---|---|---|---|
| 2,055,774 | 9/1936 | Ray | 55/387 |
| 3,330,101 | 7/1967 | Murphy, Jr. | 55/484 |
| 3,350,860 | 11/1967 | Grassel et al. | 55/387 |
| 3,411,273 | 11/1968 | Duncan et al. | 55/387 |
| 3,575,167 | 4/1971 | Michielsen | 55/482 |
| 3,576,095 | 4/1971 | Rivers | 55/516 |
| 3,581,476 | 6/1971 | Rivers | 55/387 |
| 3,686,830 | 8/1972 | Huntington | 55/233 |

Primary Examiner—Bernard Nozick
Attorney, Agent, or Firm—Lyon & Lyon

[57] ABSTRACT

A filter for gaseous pollutants having a plurality of channels therein, several of said channels being adapted to be filled with activated carbon, with remainder acting to direct the air flow from the filter. A sealing lid is provided to seal the carbon within the channels and a U-shaped sealing member extends about the inner walls of the filter preventing any air leakage around the sealed activated carbon.

3 Claims, 9 Drawing Figures

U.S. Patent  Oct. 14, 1975  Sheet 1 of 3  3,912,472
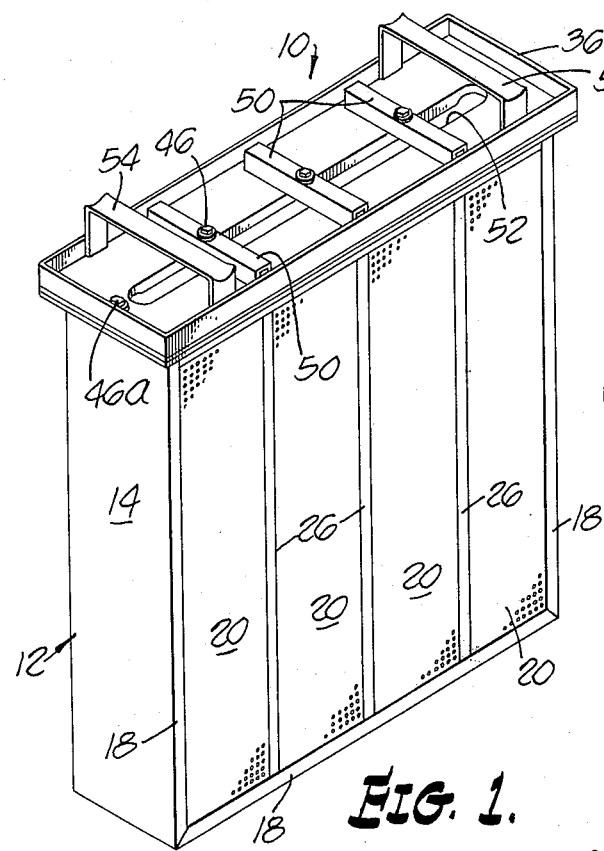
FIG. 1.
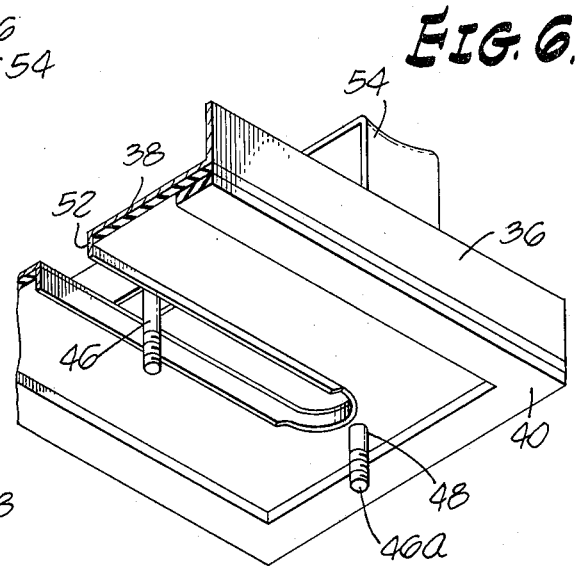
FIG. 6.
FIG. 5.
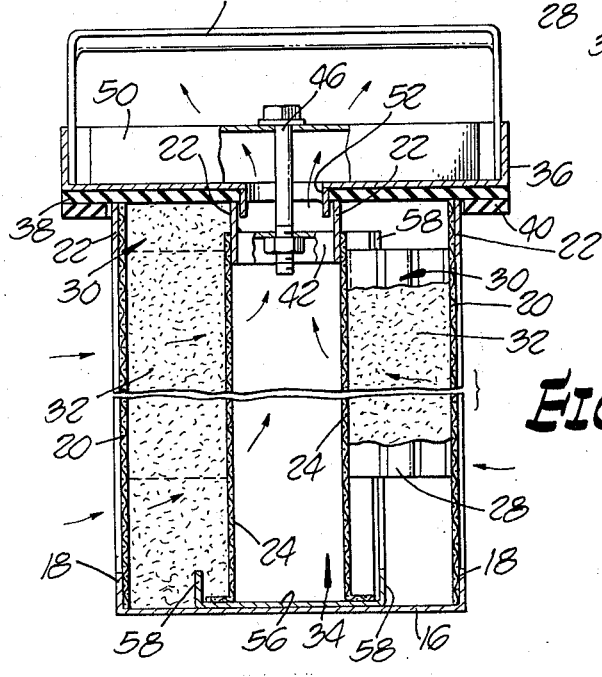
FIG. 4.
INVENTOR
ROBERT I. MARBLE
BY
Lyon + Lyon
ATTORNEYS

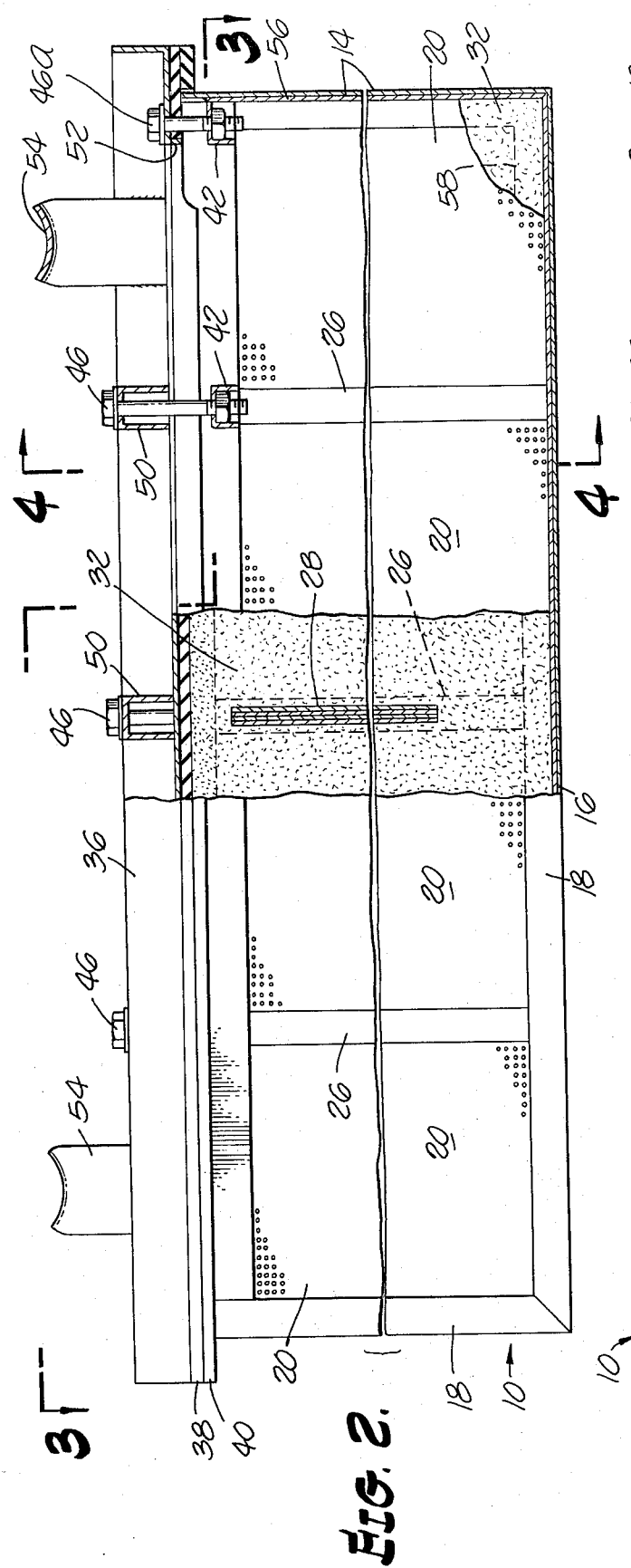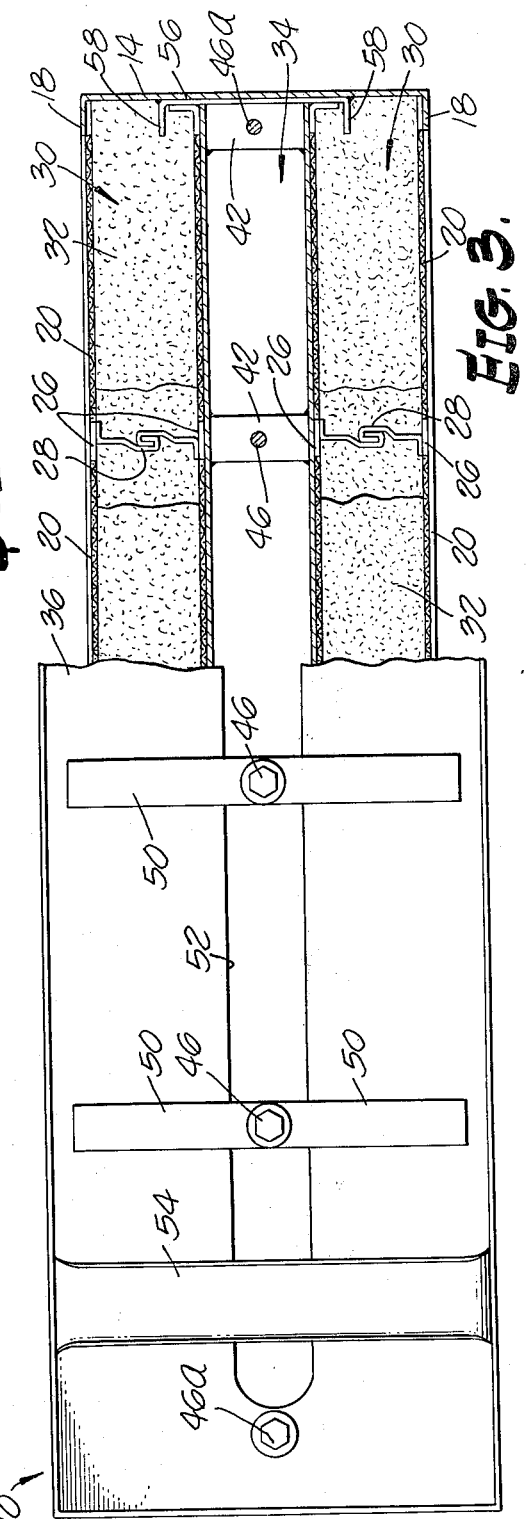

INVENTOR
ROBERT I. MARBLE
BY
Lyon & Lyon
ATTORNEYS

AIR FILTER FOR GASEOUS POLLUTANTS

BACKGROUND OF THE INVENTION

The utility of activated carbon as a filter medium is well established. The absorbent properties of activated carbon are such that most gaseous pollutants can be easily removed from a stream of air flowing therethrough. However, the pollutants cannot be filtered out if the air flow is permitted to avoid contact with the activated carbon, and therein lies a major problem with activated carbon filters. Any leak in the filter whereby the air flow or a portion thereof can somehow circumvent the carbon greatly reduces the efficiency of that filter. As a result of such leakage, most activated carbon filters operate at an efficiency below their potential. Attempts to provide air tight seals throughout the filters have generally proved unsuccessful due to the nature of the construction of the filter which makes access to all possible leakage points extremely difficult, thereby ruling out the possibility of continuous welding throughout. Redesigning the filters is also unsatisfactory due to the costs involved.

It is therefore the principal object of this invention to provide an air tight carbon filter for gaseous pollutants.

It is another object of this invention to provide an air tight activated carbon filter which is easy to disassemble for refilling.

It is a further object of this invention to provide a seal for an activated carbon filter which is simple to construct and economical to manufacture.

These and other objects and advantages of the present invention will become apparent from the following detailed description taken in conjunction with the accompanying drawings.

SUMMARY OF THE INVENTION

Briefly, the air filter has a plurality of channels therein, some being filled with activated carbon. The air flow is directed through the activated carbon and out of the filter via the unoccupied channels. A "U" shaped sealing member is positioned about the inner walls of the filter and directs stray air flow through the activated carbon which otherwise might have escaped the filter without passing through the carbon.

IN THE DRAWINGS

FIG. 1 is an isometric elevation of the filter.

FIG. 2 is a partial sectional view of the filter.

FIG. 3 is a sectional plan view of the filter taken along lines 3—3 in FIG. 2.

FIG. 4 is a sectional side view of the filter taken along lines 4—4 in FIG. 2.

FIG. 5 is an isometric view showing an upper corner of the filter with the sealing lid removed.

FIG. 6 is an isometric view showing a portion of the sealing lid.

Figure 7:
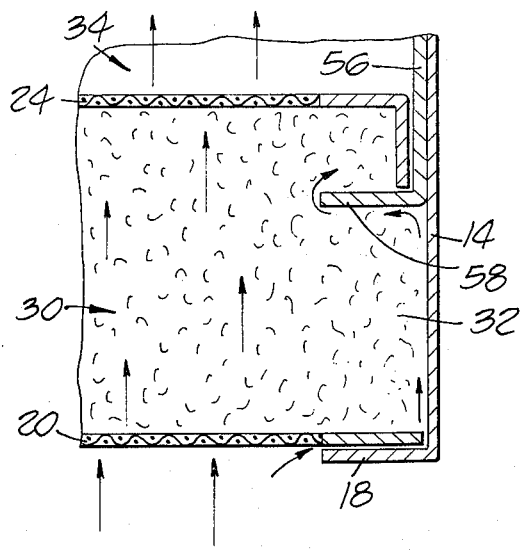
FIG. 7 is an enlarged sectional view showing the side portion of the U-shaped sealing member.

Referring now in detail to the drawings, the filter 10 is comprised of a housing 12 having solid side walls 14 and a solid rear wall 16. Perpendicular to walls 14 and 16 and secured thereto with the aid of overhanging bent flange portions 18, are outer air-pervious walls 20. Metal reinforcing strips 22 are secured along the forward edges of walls 20, as shown in FIG. 5, to add the necessary strength thereto for attaining an air tight seal (discussed below). A pair of inner air-pervious walls 24 are positioned within housing 12 in parallel relation to walls 20. Each inner air-pervious wall has a reinforcing strip 22 similarly positioned at its outer edge. The air-pervious walls have a number of supporting strips 26 secured thereto for additional strength and to provide a supporting surface for solid channel members or partitions 28, which extend between adjacent air-pervious walls and together with the inner air-pervious walls 24 divide the interior of housing 12 into a plurality of outer channels 30 and an inner channel 34, the outer channels being disposed on either side of the inner channel as shown in FIG. 5. In operation, the outer channels 30 are filled with activated carbon 32 while the central channel 34 remain empty and function as air passage ways. A sealing lid 36 is secured to the housing 12, creating an air tight seal between the carbon 32 in channels 30 and the lid itself, thereby preventing the leakage of any air within channels 30 through lid 36.

To obtain the necessary seal with the activated carbon, the underside of sealing lid 36 is provided with a fairly soft sealing surface 38 which is in actual contact with the carbon. A lip portion 40 is secured to surface 38 and is adapted to fit about the outer edges of side walls 14 and reinforcing strips 22 when lid 36 is in place on housing 12. Lip portion 40 is constructed of a material softer than sealing surface 38 to provide an air tight seal with the side walls. To secure the lid in place, the filter 10 is provided with a plurality of bolt receiving members 42 having threaded apertures 44 therein, said members being positioned between air-impervious walls 24 and carried by side walls 14 and reinforcing strips 22. A corresponding number of bolts 46, adapted to be received by receiving members 42 through apertures 44, are provided. The outer bolts 46a extend through apertures 48 in lid 36 and into the corresponding bolt receiving members, while the remaining bolts extend through stop blocks 50, through an elongated slot 52 in sealing lid 36 and into a receiving member. The sealing lid is also provided with handles 54 to facilitate carrying of the filter.

The air flow through the filter 10 is shown in FIGS. 4 and 7. The polluted air flows through air-impervious walls 20 into channels 30, through the activated carbon 32 therein, and then into central channels 34 where it exits the filter through elongated slot 52. With the tightening of bolts 46 and 46a, the combination of the sealing surface 38 tightly pressing against the activated carbon 32 and the edges of the side walls 14 and reinforcing strips 22 digging into the sealing surface 38 and pressed firmly against the lip portion 40, forms an air tight seal between the activated carbon and sealing lid 36, and no air can escape the filter other than through slot 52. However, as noted earlier, to obtain a high efficiency in such filters it is necessary that all of this air flow must pass through the activated carbon 32. Thus, in addition to preventing any leakage between the activated carbon and the lid, any flow of air which might reach the central channel 34 along side walls 14 or rear wall 16 thereby avoiding major contact with the activated carbon must also be prevented. This leakage along the walls of the filter has proved to be a shortcoming in such activated carbon filters and is due to the difficulty to make a seal along the walls as a result of their inaccessibility. To prevent this leakage a U-shaped sealing member 56 is secured to both side walls 14 and rear wall 16. In manufacture, the U-shaped member 56 is tightly secured to walls 14 and 16 prior to formation into housing 12. With this U-shaped sealing member in place, the air which would otherwise flow along the walls and into the central channels without passing through the activated carbon abuts the side portion or arms 58 of the U-shaped member 56 and is directed into channel 30 containing the activated carbon as shown in detail in FIG. 7. This eliminates the possibility of any air flow through the filter 10 reaching the central exit channels 34 without first flowing through the filtering carbon and thus increases the efficiency of the filter.

Figure 8:
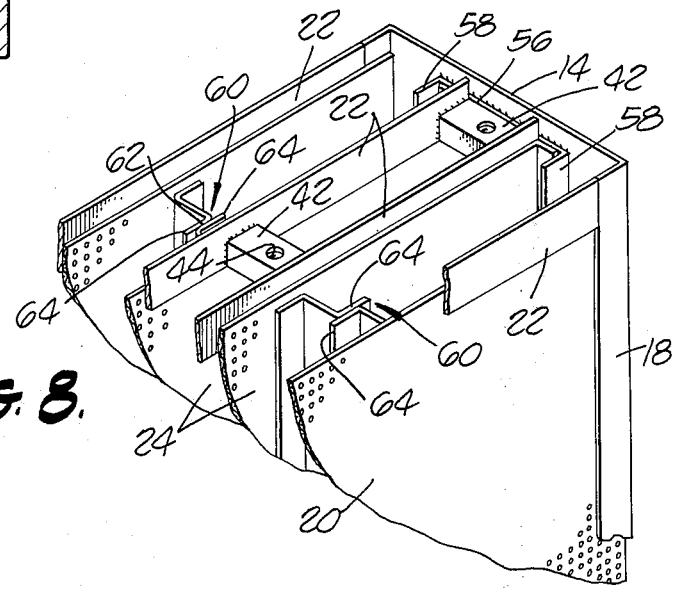
FIG. 8 is an isometric view of a second embodiment of the invention showing an upper corner of the filter with the sealing lid removed.
Figure 9:
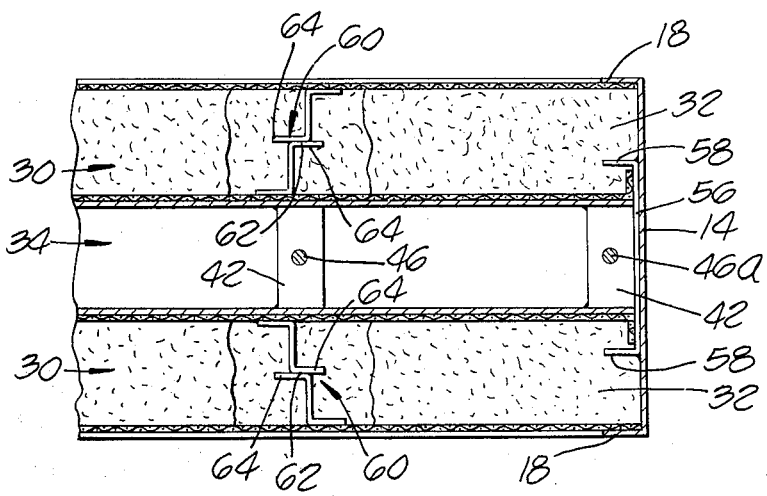
FIG. 9 is a partial sectional plan view of the second embodiment of the filter showing the flanged channel members.

In a second embodiment of the invention, shown in FIGS. 8 and 9, the solid channel members 28 of the first embodiment are replaced with flanged channel members 60 and supporting strips 26 are not included. Channel members 60 are comprised of a pair of Z-shaped members welded together at 62 forming flange portions 64. Flange portions 64 act as side portions 58 and direct any air moving along channel members 60 into channel 30 containing the filtering medium, thereby further preventing the possibility of any air flow from the filter without first passing through the filtering medium therein.

Various changes and modifications may be made in carrying out the present invention without departing from the scope and spirit thereof. Insofar as these changes and modifications are in the perview of the appended claims, they are to be considered as part of the invention.

What is claimed is:

1. For a filter of the type utilizing activated carbon as a filtering media for removing gaseous pollutants from an air flow, a filter housing comprising an open faced housing having rear and side walls and a pair of air-pervious walls, said air-pervious walls defining inlets to said housing, a pair of inner air-pervious walls disposed within said housing and extending between said side walls of said housing, said inner air-pervious walls dividing the interior of said housing into a plurality of channels, one of said channels being adjacent each of the air-pervious walls of said housing, thereby defining a pair of outer channels, and another of said channels being disposed between said outer channels, and a U-shaped sealing member carried by said housing, said sealing member having a base and arm portions, said arm portions being substantially perpendicular to said base portion, said base portion being secured to said side walls and said rear wall of said housing, one arm of said sealing member extending into one of said outer channels and the other of said arms extending into the other of said outer channels, whereby any air flow along a side or rear wall of said housing is directed into the interior of one of said outer channels and means for sealing the outer channels.

2. The combination of claim 1 including a plurality of channel members, said channel members extending between the outer pervious walls of said housing and said inner pervious walls thereby dividing each of said outer channels into a plurality of rows of channels.

3. The combination of claim 2 including a plurality of flange portions disposed on said channel members, said flange portions extending into each of said outer channels in a direction substantially parallel with said air portions of said U-shaped sealing member whereby any air flow along a channel member within said outer channels is directed into the interior of said channels.

* * * * *